United States Patent [19]

Stram et al.

[11] Patent Number: 5,262,913
[45] Date of Patent: Nov. 16, 1993

[54] EASILY ADJUSTABLE CRASH STOP FOR A DISC DRIVE

[75] Inventors: Jeffrey P. Stram; Thomas A. Hickox, both of Santa Cruz County, Calif.

[73] Assignee: Seagate Technology, Inc., Scotts Valley, Calif.

[21] Appl. No.: 13,144

[22] Filed: Feb. 1, 1993

Related U.S. Application Data

[63] Continuation of Ser. No. 611,129, Nov. 9, 1990, abandoned.

[51] Int. Cl.⁵ .......................... G11B 5/54; G11B 21/22
[52] U.S. Cl. ..................................... 360/105; 360/106
[58] Field of Search ................. 360/97.01, 105, 106; 369/203, 215, 292

[56] References Cited

U.S. PATENT DOCUMENTS

| | | | |
|---|---|---|---|
| 4,346,416 | 8/1982 | Riggle et al. | 360/106 |
| 4,716,482 | 12/1987 | Walsh | 360/106 |
| 4,947,274 | 8/1990 | Casey et al. | 360/105 |
| 4,949,206 | 8/1990 | Phillips et al. | 360/97.01 |
| 5,134,608 | 7/1992 | Strickler et al. | 360/106 |
| 5,187,627 | 2/1993 | Hickox et al. | 360/105 |

Primary Examiner—Stuart S. Levy
Assistant Examiner—Jefferson Evans
Attorney, Agent, or Firm—Flehr, Hohbach, Test, Albritton & Herbert

[57] ABSTRACT

A crash stop is provided formed of a cast metal body having a contact surface made of butyl rubber material selected and dimensioned to provide easily controllable impact and shock absorbency characteristics. The adjustment of the limit of motion of the actuator is accomplished by mounting the crash stop to a fixed portion of the actuator or other stationary part of the disc drive in a manner that allows the crash stop to be rotated about an axis that is approximately perpendicular to the axis of motion of the actuator, and providing a contact surface which is an arc of a circle centered on an axis parallel to, but not coincident with, the axis of rotation of the crash stop. Thus, rotation of the crash stop about its mounting axis presents a contact point with the moving portion of the actuator that varies in distance from the mounting axis.

14 Claims, 3 Drawing Sheets

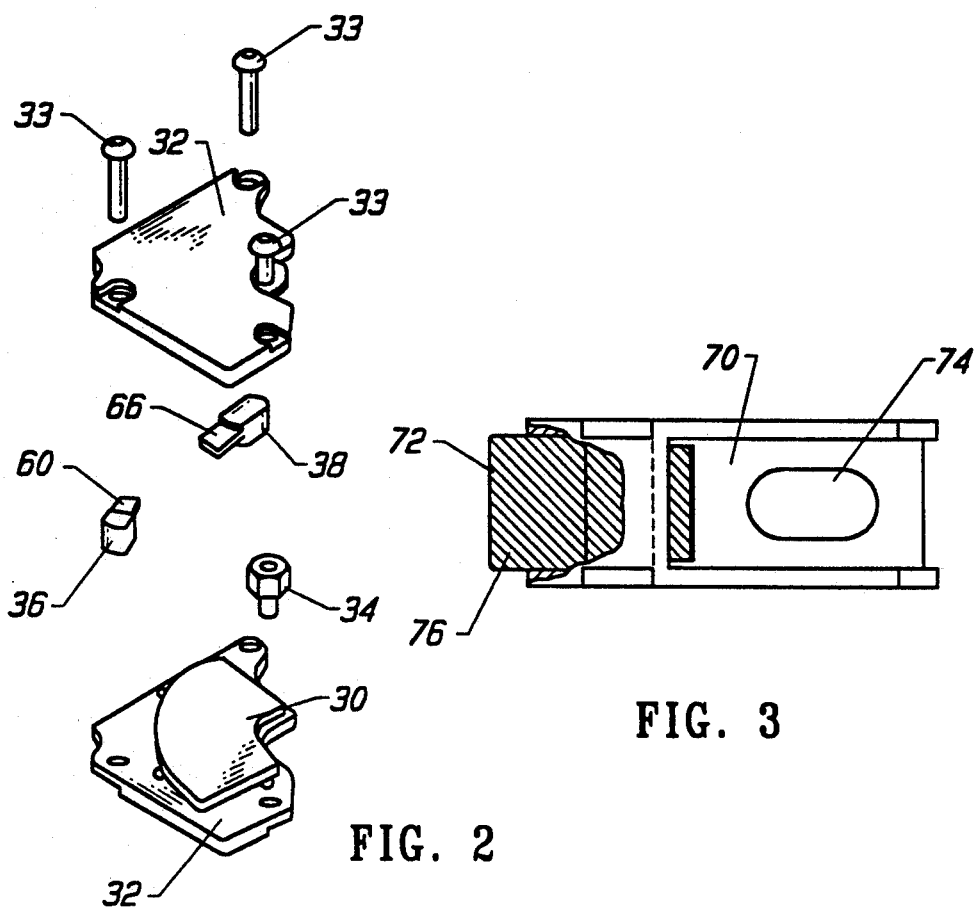
FIG. 2
FIG. 3
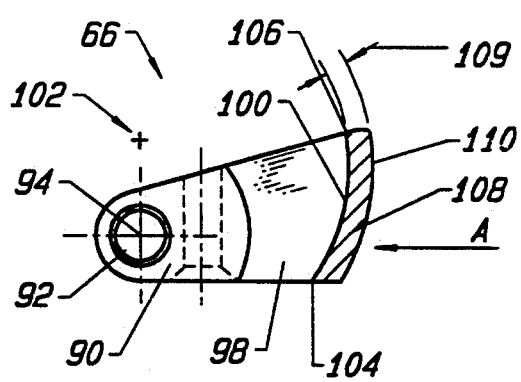
FIG. 4A
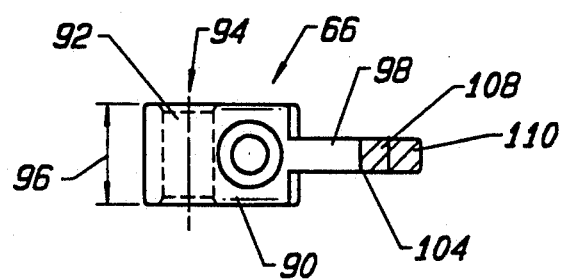
FIG. 4B

5,262,913

EASILY ADJUSTABLE CRASH STOP FOR A DISC DRIVE

This is a continuation of application Ser. No. 07/611,129 filed Nov. 9, 1990 now abandoned.

FIELD OF THE INVENTION

This invention relates generally to the field of rigid disc drive data storage devices and more particularly to an improved crash stop for limiting the range of motion of the actuator which moves the read/write heads over the disc. A significant feature of the invention is its capability of easily and precisely adjusting the limit on this range of motion within a predefined range.

BACKGROUND OF THE INVENTION

Disc drive data storage devices of the type in which the present invention is particularly useful are well known in the industry. Such disc drives typically have a base housing to which other components are mounted. These other components consist of a spindle motor, usually of the brushless DC type, having a hub on which one or more discs are mounted for rotation at a constant speed of 3600 RPM or greater. Each disc surface contains a large number of circular, concentric data tracks onto which data can be written and from which data can be read.

The mechanism for performing these reading and writing functions is a number of read/write heads—usually one per disc surface—that are carried from track to track by an actuator mechanism.

Actuator mechanisms generally fall into two categories:

1) linear actuators which move the heads in a straight line along a radius of the disc (or parallel to a radius of the disc), using ball bearings or self-lubricating bushings in cooperation with an arrangement of guide rails or rods, or;

2) rotary actuators which pivot the heads in an arc across the disc surface about an axis of rotation closely adjacent the outer diameter of the discs.

Both of these types of actuator require some sort of motor to provide the desired movement, and again there are two common types of motor most frequently used in the industry:

1) stepper motors, and;

2) voice coil motors (VCMs).

Both of these types of motor operate under the control of electronic circuitry to controllably move the actuator—and thus the read/write heads—in response to commands issued by a host computer or an "on-board" controller within the disc drive.

Whichever type of actuator and actuator motor are used, the allowable range of motion must be limited to ensure that the read/write heads act properly in cooperation with the discs. Therefore, both an inner limit—toward the center of the disc—and an outer limit—toward the outside diamter of the disc—must be established. It is easy to imagine the damage that could occur if the read/write heads were to move in an uncontrolled manner toward the center of the disc and collide with the hub mounting the disc. Similar damage could occur from uncontrolled movement of the heads in the opposite direction.

If perfect, fault-free operation of the controlling electronic circuitry were possible, then these limits could be established using only the electronic circuitry. However, because of the possibility of failure in components of this type, mechanical restricting means are usually employed.

These mechanical means for restricting the range of motion of the actuator and read/write heads are frequently referred to in the industry as "crash stops", and have taken many forms over the years. An example of crash stops in a linear stepper motor disc drive is disclosed in U.S. Pat. No. 4,471,396, issued Sep. 11, 1984, assigned to the assignee of the present invention and incorporated herein by reference.

Furthermore, since disc drives using VCM actuators have no inherent magnetic detent to maintain their position without power, this type of disc drive incorporates a "park position"—usually at one end of the range of motion of the actuator—to which the actuator is moved at a power loss, and some sort of latching mechanism to hold the actuator in the park position until power is restored.

Many types of latching mechanisms have been used for this purpose and examples of such latches can be found in U.S. Pat. Nos. 4,725,907, issued Feb. 16, 1988, and 4,716,480, issued Dec. 29, 1987, both assigned to the assignees of the present invention and incorporated herein by reference.

In some disc drive designs the latching mechanism for holding the actuator in the park position has been integrated with the associated crash stop, as in U.S. Pat. No. 4,890,176, issued Dec. 19, 1989, and U.S. Pat. No. 5,187,627 filed Nov. 9, 1990, both again assigned to the assignee of the present invention and incorporated herein by reference.

Current state-of-the-art disc drives are capable of moving the read/write heads at speeds of 60 inches per second or more, and have track densities (measured radially on the disc surface) of 1750 tracks per inch or greater.

From these figures, it is evident that an effective crash stop must be capable of absorbing a relatively large amount of energy if the actuator reaches its "end of travel" in an uncontrolled manner. The specific amount of energy to be absorbed is dependent on the moving mass and the velocity at the time of impact. Therefore, a crash stop with an easily selected and controllable ability to absorb this type of shock is to be desired.

Furthermore, the location of the limit of travel should be easily and precisely adjustable, since small variations in this setting can involve the loss or retention of a number of data tracks, thus greatly influencing the total storage capacity of the disc drive.

OBJECTIVES OF THE INVENTION

It is an objective of the invention to provide a crash stop for limiting the range of motion of a disc drive actuator in one direction.

It is another objective of the present invention to provide a crash stop that has an easily selectable ability to absorb the energy of the impact of the moving actuator when contact is made.

It is another objective of the present invention to provide a crash stop that makes adjustment of the limit of motion of the actuator easy and precise.

It is a further objective of the present invention to fabricate such a crash stop from a minimum of parts and using inexpensive, proven manufacturing methods.

SUMMARY OF THE INVENTION

The above defined objectives of the invention are accomplished by providing a crash stop formed of a cast metal body having a contact surface made of butyl rubber material selected and dimensioned to provide easily controllable impact and shock absorbency characteristics. The adjustment of the limit of motion of the actuator is accomplished by mounting the crash stop to a fixed portion of the actuator or other stationary part of the disc drive in a manner that allows the crash stop to be rotated about an axis that is approximately perpendicular to the axis of motion of the actuator, and providing a contact surface which is an arc of a circle centered on an axis parallel to, but not coincident with, the axis of rotation of the crash stop.

Thus, rotation of the crash stop about its mounting axis presents a contact point with the moving portion of the actuator that varies in distance from the mounting axis.

A significant feature of the invention is that contact between the moving portion of the actuator and the contact surface of the crash stop results in not only a compressive force on the contact material but also in a significant shear force, which makes the deceleration of the actuator more easily controllable.

DESCRIPTION OF THE DRAWINGS

The features and advantages of the present invention may be best understood by referring to the accompanying drawings, in which:

FIG. 2 is an exploded view of a portion of the actuator motor of FIG. 1;

FIG. 3 is a drawing of a prior art crash stop;

FIG. 4A is a elevation view of the crash stop of the present invention;

FIG. 4B is a plan view of the crash stop of the present invention, and;

DETAILED DESCRIPTION OF THE INVENTION

Figure 1:
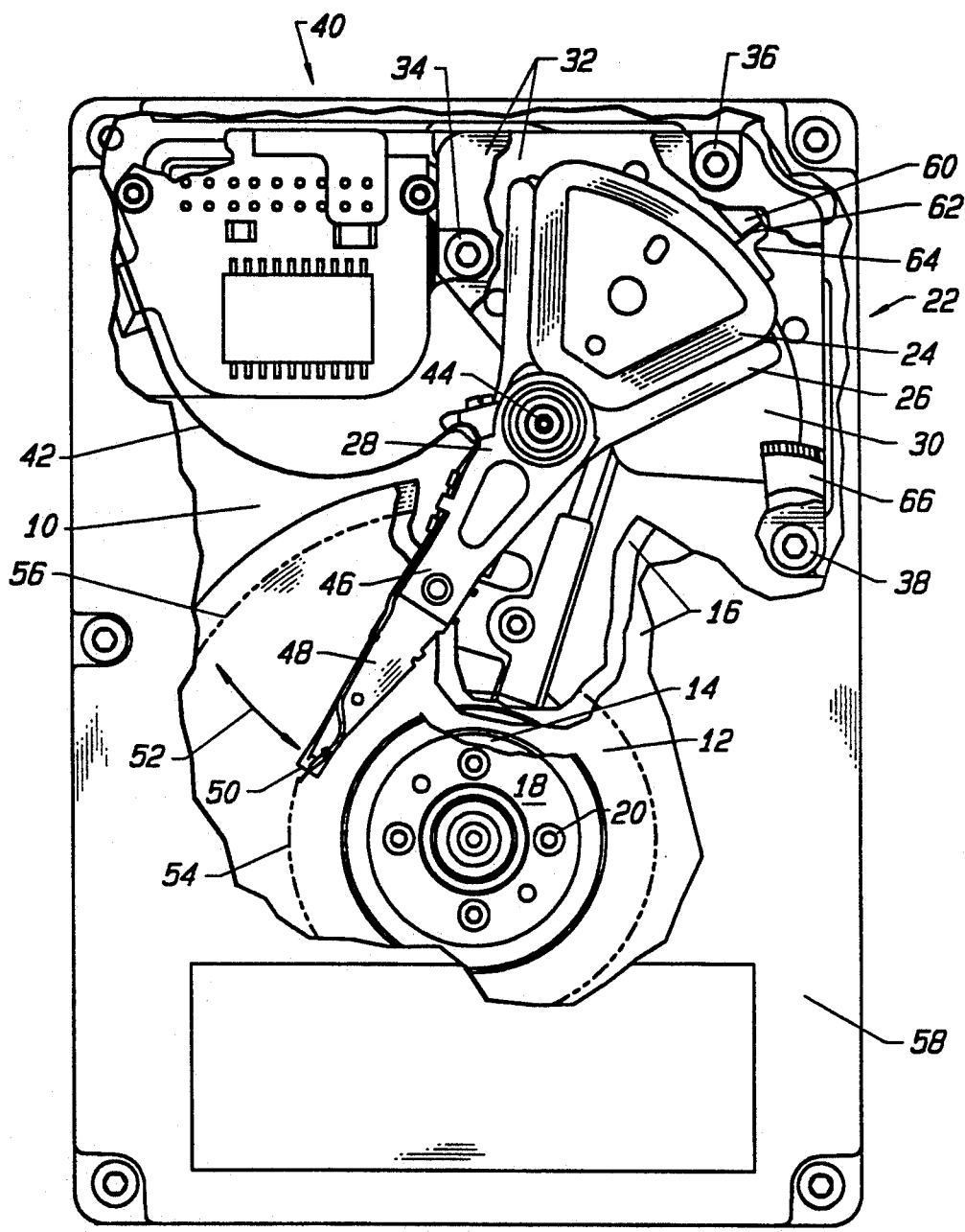
FIG. 1 is a plan view of a disc drive in which the present invention is particularly useful.

Referring first to FIG. 1, shown is a rigid disc drive data storage device of the type in which the present invention is particularly useful. This example disc drive is of the rotary/VCM type. FIG. 1 contains many partial cutaways to show details of the assembly.

The disc drive consists of a base housing 10 to which other components are mounted. A spindle motor, shown generally at 12, is mounted to the base housing 10 and carries a hub 14 on which the discs 16 are supported. The discs 16 are secured to the hub 14 by a disc clamp 18 held by screws 20. In this example, the discs will be spinning in the counter-clockwise direction as viewed.

A voice coil motor (VCM), shown generally at 22, is made up of a flat coil 24 mounted between two coil mounting arms 26 that are part of a Y-shaped actuator arm 28. The VCM is also made up of a pair of permanent magnets above and below the coil—one of which is shown at 30—attached to steel plates 32 spaced apart by standoffs 34, 36, 38. Electronic circuitry, some of which is shown generally at 40, supplies controlled DC current to the coil 24 via a printed circuit cable 42 to energize the coil 24, inducing magnetic flux which interacts with the magnetic field of the permanent magnets 30 to move the coil 24 and attached actuator arm 28 about a pivot point 44. The third portion of the actuator arm 28 is made up of several head mounting arms 46 which carry a number of load beam/gimbal assemblies (LGA) 48 to which are attached the read/write heads 50. As the actuator arm 28 pivots about the pivot point 44, the heads 50 are selectively moved along arc 52 to any of the data tracks lying between the innermost data track 54 and the outermost data track 56.

The entire assembly is enclosed by a top cover 58 mated to the base housing 10.

The actuator arm 28 is shown in its park position with the read/write heads 50 at a location inside the innermost data track 54. The actuator is held in this position by the interaction of an integrated magnetic latch and crash stop 60—the subject of the previously cited U.S. Pat. No. 5,187,627 filed Nov. 9, 1990 —and a magnetizable metal striker plate 62 carried on a tab 64 mounted to the actuator coil 24.

The crash stop 66 of the present invention limits range of motion of the actuator in the opposite direction when the nearer of the two coil mounting arms 26 contacts the crash stop 66.

The construction of the stationary portion of the actuator motor 22, and the mounting of the crash stop of the present invention can be best understood by referring to FIG. 2.

In FIG. 2, the stationary portion of the actuator motor 22 of FIG. 1 is shown in exploded form.

A pair of permanent magnets 30 (one shown) are mounted on steel plates 32 which are fastened together by three screws 33 which pass through three standoffs 34, 36, 38 which maintain the steel plates 32 and permanent magnets 30 in a fixed spatial relationship. The first standoff 34 is a simple spacing unit, while the second standoff 36 also incorporates the integrated magnetic latch and crash stop 60 used to define the inner limit of the range of motion of the actuator (not shown). For the purposes of this explanation, the terms "inner" and "outer", used to define actuator position, will refer to those positions of the actuator where the read/write heads are closest to and farthest from the center of the disc, respectively.

The third standoff 38 is part of the improved crash stop 66 of the present invention, which in this embodiment is used to define the outer limit of the range of motion of the actuator. As can be seen, the crash stop 66 is capable of rotation about the mounting screw 33 which forms an axis of rotation for the crash stop 66 that is perpendicular to the plane of the steel plates 32 and magnets 30. An examination of FIG. 1 will also show this axis of rotation to be approximately perpendicular to the direction of motion of the actuator arm 28 at the time the coil mounting arm 26 contacts the crash stop 66.

Certain advantages of the present invention become most evident by the study of example from the prior art.

Shown in FIG. 3 is an example of a crash stop from the prior art. This figure shows an elongated hole 74 in a frame 70 used to mount the assembly to a stationary portion of the disc drive in which it is used. This mounting operation is accomplished by inserting a screw (not shown) through the elongated hole into a tapped hole. By sliding the unit right or left before tightening the screw to hold the assembly in place, the contact surface 72, on the left end of the assembly as viewed, can be moved in relationship to the mating contact point on the moving part of the actuator (not shown). This means of mounting a crash stop does have certain drawbacks.

First, since the direction of motion employed for adjustment is effectively the same as the direction of travel of the actuator, it is difficult to move the crash stop assembly in small enough increments to precisely control the limit on the range of motion of the actuator. It should be recalled that the track-to-track separation on the disc surface is typically less than 0.001 inch.

Secondly, since the attachment is made with a single screw, there is a tendency for the assembly to rotate about the screw during assembly, causing a lack of parallelism between the contact surfaces. This also contributes to the difficulty in precisely setting the location of the crash stop.

This prior art crash stop also incorporates a resilient element 76 used to absorb the energy of contact when the actuator contacts the crash stop. This resilient element 76 absorbs this energy in a purely compressive mode, a fact that will be considered below.

Turning to FIGS. 4A and 4B, shown are elevation and plan views of the crash stop 66 of the present invention. The crash stop consists of a body 90 incorporating a hole 92 for rotatably mounting the crash stop to a stationary portion of the actuator or other non-moving portion of the disc drive. This mounting hole 92 is centered on the axis of rotation 94 of the crash stop. The height 96 of the body 90 forms a standoff in this embodiment used to establish the separation between the steel plates of the VCM actuator motor (32 in FIGS. 1 and 2).

The body 90 of the crash stop also incorporates an arm 98 extending radially outward from the body in a plane perpendicular to the axis of rotation 94. The distal end of this arm 98 is an arc of a cylinder centered about an axis 102 which is parallel to but displaced from the axis of rotation 94. This creates an outer surface 100 that has a first end 104 nearest the axis of rotation 94 and gradually extends farther from the axis of rotation 94 until a second end 106, farthest from the axis of rotation, is reached. Attached to the outer surface 100 of the arm 98 is a resilient contact member 108 which has a contact surface 110 parallel to the outer surface 100 of the arm 98. This contact member may be adhesively attached to the outer surface 100 of the arm 98, or molded on the arm thus forming a vulcanized chemical bond.

The radial thickness 109 of the contact member 108 is one of the elements defining the energy absorption characteristics of the crash stop 66.

If the contact surface of the moving portion of the actuator is envisioned to approach the crash stop from the right in FIGS. 4A and 4B as shown by arrow "A" in FIG. 4B, it is apparent that rotating the crash stop about its axis of rotation 94 will change the point of contact on the contact surface 110, thus varying the proximity of the moving portion of the actuator to the axis of rotation 94.

Since the contact surface 110 acts as a camming surface, a given rotational movement of the crash stop about its axis of rotation 94 produces a relatively small change in the distance between the contact point on the contact surface 110 and the axis of rotation, thus facilitating very precise setting of the limit on the actuator range of motion.

In experimental fabrications of the crash stop of the present invention, it has been found that suitable materials for the body of the crash stop include an aluminum alloy (Aluminum 6001-C(T-4)) plated with an electroless nickel coating or suitably passivated stainless steel 303.

Likewise, a butyl rubber, Durometer 40±10%, Shore A, has been experimentally found suitable for the specific application being used as an example. Other materials may be suitable for different applications, dependent on thermal considerations, and the velocity and mass of the moving portion of the actuator.

A further advantage of the crash stop of the present invention involves the angle at which the contact surface 110 contacts the moving portion of the actuator. As previously mentioned, the direction of motion of the actuator at the time of contact is approximately perpendicular to the axis of rotation 94. The crash stop should also be located—and the contact point on the moving portion of the actuator selected—so that the contact point on the moving portion of the actuator is moving toward the axis of rotation at contact as shown by arrow "A" on FIG. 4B. Since the arc of the contact surface 110 is not centered on the axis of rotation 94, this will cause the angle of contact to be displaced from a true radius of the contact surface 110. This means that the force of the contact will not be directed in line with the radius of the contact surface 110, but toward the axis of rotation, causing not only a compressive action on the resilient contact member, but a shear action as well. The advantage of this type of contact is best explained by referring to FIG. 5.

Figure 5A:
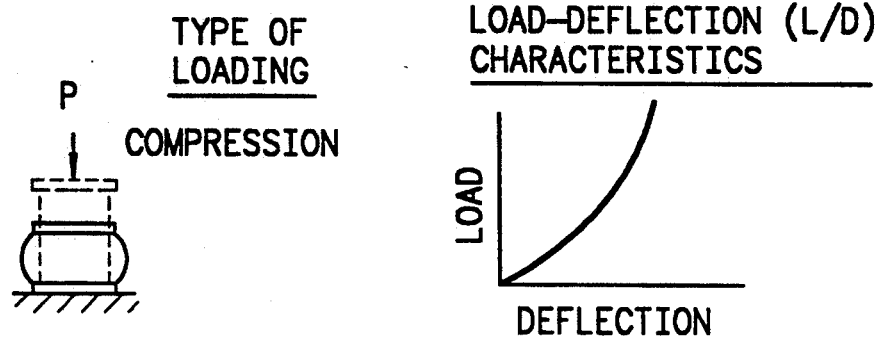
FIGS. 5A and 5B depict graph and deceleration characteristics, comparing prior art crash stops with the crash stop of the present invention.
Figure 5B:
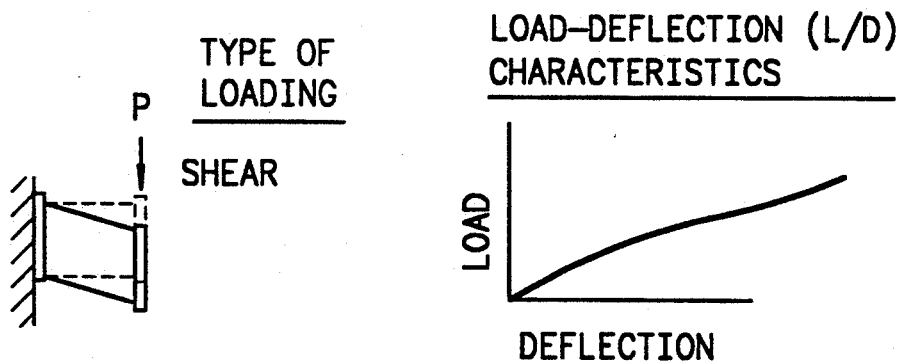

FIG. 5 shows a comparison of the load versus deflection characteristics of a non-specific rubber material. The letter "P" and the associated arrow shows the vector in which pressure is applied to the material to vary the load component of the graphs.

As shown in FIG. 5, the compression mode of loading an elastic material is defined as pressure applied at the free end of the material and perpendicular to the mounting surface, while the pure shear mode applies pressure in a vector parallel to the mounting surface.

Deflection is defined as the amount that the contact surface moves in response to the applied pressure or load.

As can be seen from the graphs, loading the elastic material in a purely compressive mode results in increasingly large deflection as the load increases. This is the reason that the prior art crash stop of FIG. 3 requires a relatively thick resilient member, since it is designed to absorb the load energy of contact with the moving portion of the actuator in a purely compressive manner.

Referring again to FIG. 5, it is apparent that in the pure shear mode, increases in the load create a much more gradual increase in deflection.

Recalling that a crash stop for a disc drive is intended to absorb the impact of the moving portion of the actuator—and the load deflection curves of FIG. 5—it is apparent that a crash stop using a pure compressive mode will result in a relatively large deflection when this load is instantaneously applied. This large deflection also can result in significant resonance or "bounce" when the moving actuator contacts the crash stop.

As mentioned above, the crash stop of the present invention is designed to incorporate a significant shear element in the area of contact as a result of having the contact surface of the crash stop formed as an arc of a cylinder that is not centered on the center of rotation and the direction of motion of the actuator being toward this center of rotation. This will result in a much more gradual increase in deflection with increases in load, allowing a thinner contact element and reducing the amount of "bounce" in the system.

In summary, the crash stop of the present invention incorporates a main body designed for rotatable attachment to a stationary point of the disc drive with a single screw that acts as an axis for rotation. This axis of rotation is selected to be perpendicular to the direction of motion of the actuator at the time of contact between the moving portion of the actuator and the crash stop. Formed as a part of the crash stop body is an arm extending in a plane perpendicular to the axis of rotation and coincident with the plane in which the contact surface on the moving portion of the actuator lies. The distal end of this arm is formed as an arc of a cylinder centered about a second axis that is parallel to but not coincident with the axis of rotation, thus forming a eccentric surface with a varying distance from the axis of rotation.

Attached to this eccentric surface is a resilient contact member of an elastic material having a radial thickness centered on the second axis described above. The material and thickness are selected as appropriate to absorb the energy of the moving actuator based on the mass and velocity of the actuator.

The eccentricity of the contact surface of the crash stop allowed the distance of the contact point from the axis of rotation to be adjusted by rotating the body of the crash stop about the axis of rotation, facilitating simple and precise setting of the limit on the range of motion of the actuator.

Further, since the direction of motion of the actuator is toward the axis of rotation of the crash stop, and the contact surface of the crash stop is not centered on this axis of rotation, contact between the crash stop and the moving portion of the actuator results in both compression and shear force on the contact material, resulting in a more gradual and controllable deflection of the contact material.

Finally, in the embodiment described, the crash stop of the present invention is integrated with a standoff used to mount and separate the magnet-mounting plates of the voice coil motor.

Although this discussion has centered around the specific embodiment of a rotary/VCM type of disc drive, it is equally applicable to linear actuator drives and other types of actuator motor.

Modifications to the present invention may become apparent to a person skilled in the art after studying this disclosure. Therefore, the scope of the invention is to be limited only by the following claims.

What is claimed is:

1. In a disc drive data storage device comprising a base for mounting other elements, said other elements comprising: a spindle motor mounting at least one disc shaped data storage element for rotation thereon; at least one surface of said disc shaped storage element comprising a plurality of circular, concentric data tracks upon which data may be stored and from which data may be retrieved; said other elements further comprising actuator means under control of electronic circuitry for moving at least one read/write head into cooperative arrangement with said data tracks; said actuator means comprising a stationary portion mounted in fixed relationship with said base and a moving portion mounting said read/write head; said moving portion having a defined range of motion along a fixed path, said range of motion having limits defined as inner and outer limits wherein said outer limit is the farthest point of motion of said read/write head away from the center of said disc shaped storage element and said inner limit is the farthest point of motion of said read/write head toward the center of said disc shaped storage element; said moving portion also comprising at least one contact surface adapted to contact a point on the non-moving portion of the disc drive;

the improvement comprising an improved crash stop for establishing at least one of said limits of said range of motion of said moving portion of said actuator, said crash stop comprising:

a body portion including mounting means for mounting said crash stop to said stationary portion of said actuator or said base;

said mounting means comprising a cylindrical bore adapted for co-operative engagement with a single screw or similar cylindrical mounting element on said stationary portion of said actuator or said base;

said cylindrical bore and said cylindrical mounting element having a common central axis as assembled into said co-operative arrangement, wherein said common central axis acts as an axis of rotation for said crash stop and said axis of rotation is perpendicular to said fixed path of motion of said moving portion of said actuator;

said body portion further comprising an arm extending radially from said axis of rotation of said body portion and circumferentially in a plane perpendicular to said axis of rotation;

said arm having a distal end forming an arc of a cylinder the central axis of which is parallel to but not coincident with said axis of rotation of said crash stop, whereby said distal end of said arm comprises an eccentric surface relative to said axis of rotation of said crash stop;

said crash stop further comprising a contact element of a resilient material mounted on said distal end of said arm and said contact element having a contact surface thereon parallel to said distal end of said arm;

said crash stop being rotatable about said axis of rotation;

said rotation of said crash acting to bring one contact point on said contact surface into co-operative arrangement with said contact surface on said moving portion of said actuator;

said rotation of said crash stop being releasably lockable in a selected position to establish a desired contact point with said single screw or similar cylindrical mounting element;

said rotation further acting to vary the distance between said contact point and said axis of rotation, thus adjusting the location of said limit of said range of motion of said moving portion of said actuator.

2. An improved crash stop as claimed in claim 1 wherein said contact element has a thickness between said distal end of said arm and said contact surface of said contact element, said thickness and said resilient material being selected to determine the deflection characteristics of said crash stop.

3. An improved crash stop as claimed in claim 2 wherein said arm has a defined thickness in said axis of rotation and said contact element has a thickness in the same axis, said contact element thickness and said arm thickness being substantially the same.

4. An improved crash stop as claimed in claim 1 wherein said fixed path of motion of said moving portion of said actuator intersects said contact surface of said contact element at an angle of intersection which is not perpendicular to a tangent to said contact surface at said contact point.

5. An improved crash stop as claimed in claim 4 wherein said angle of intersection causes deflection of said contact element in both compression and shear modes when said contact surface on said moving portion of said actuator contacts said contact surface on said contact element of said crash stop.

6. An improved crash stop as claimed in claim 1 wherein said fixed path of motion of said moving portion of said actuator intersects said contact surface of said contact element at an angle of intersection which is not a true radius of said contact surface at said contact point.

7. An improved crash stop as claimed in claim 6 wherein said angle of intersection causes deflection of said contact element in both compression and shear modes when said contact surface on said moving portion of said actuator contacts said contact surface on said contact element of said crash stop.

8. An improved crash stop for use in a disc drive data storage device, said disc drive comprising a base for mounting other elements, said other elements comprising: a spindle motor mounting at least one disc shaped data storage element for rotation thereon; at least one surface of said disc shaped storage element comprising a plurality of circular, concentric data tracks upon which data may be stored and from which data may be retrieved; said other elements further comprising actuator means under control of electronic circuitry for moving at least one read/write head into co-operative arrangement with said data tracks; said actuator means comprising a stationary portion mounted in fixed relationship with said base and a moving portion mounting said read/write head; said moving portion having a defined range of motion along a fixed path, said range of motion having limits defined as inner and outer limits wherein said outer limit is the farthest point of motion of said read/write head away from the center of said disc shaped storage element and said inner limit is the farthest point of motion of said read/write head toward the center of said disc shaped storage element; said moving portion also comprising at least one contact surface adapted to contact a point on the non-moving portion of the disc drive;

said crash stop serving to establish one of said limits on said range of motion and comprising a body portion including mounting means for mounting said crash stop to said stationary portion of said actuator or said base;

said mounting means comprising a cylindrical bore adapted for co-operative engagement with a single screw or similar cylindrical mounting element on said stationary portion of said actuator or said base;

said cylindrical bore and said cylindrical mounting element having a common central axis as assembled into said co-operative arrangement, wherein said common central axis acts as an axis of rotation for said crash stop and said axis of rotation is perpendicular to said fixed path of motion of said moving portion of said actuator;

said body portion further comprising an arm extending radially from said axis of rotation of said body portion and circumferentially in a plane perpendicular to said axis of rotation;

said arm having a distal end forming an arc of a cylinder the central axis of which is parallel to but not coincident with said axis of rotation of said crash stop, whereby said distal end of said arm comprises an eccentric surface relative to said axis of rotation of said crash stop;

said crash stop further comprising a contact element of a resilient material mounted on said distal end of said arm and said contact element having a contact surface thereon parallel to said distal end of said arm;

said crash stop being rotatable about said axis of rotation;

said rotation of said crash stop acting to bring one contact point on said contact surface into co-operative arrangement with said contact surface on said moving portion of said actuator;

said rotation of said crash stop being releasably lockable in a selected position to establish a desired contact point with said single screw or similar cylindrical mounting element;

said rotation further acting to vary the distance between said contact point and said axis of rotation, thus adjusting the location of said limit of said range of motion of said moving portion of said actuator.

9. An improved crash stop as claimed in claim 8 wherein said contact element has a thickness between said distal end of said arm and said contact surface of said contact element, said thickness and said resilient material being selected to determine the deflection characteristics of said crash stop.

10. An improved crash stop as claimed in claim 9 wherein said arm has a defined thickness in said axis of rotation and said contact element has a thickness in the same axis, said contact element thickness and said arm thickness being substantially the same.

11. An improved crash stop as claimed in claim 8 wherein said fixed path of motion of said moving portion of said actuator intersects said contact surface of said element at an angle of intersection which is not perpendicular to a tangent to said contact surface at said contact point.

12. An improved crash stop as claimed in claim 11 wherein said angle of intersection causes deflection of said contact element in both compression and shear modes when said contact surface on said moving portion of said actuator contacts said contact surface on said contact element of said crash stop.

13. An improved crash stop as claimed in claim 8 wherein said fixed path of motion of said moving portion of said actuator intersects said contact surface of said contact element at an angle of intersection which is not a true radius of said contact surface at said contact point.

14. An improved crash stop as claimed in claim 13 wherein said angle of intersection causes deflection of said contact element in both compression and shear modes when said contact surface on said moving portion of said actuator contacts said contact surface on said contact element of said crash stop.

* * * * *